United States Patent [19]
Adams

[11] Patent Number: 5,199,637
[45] Date of Patent: Apr. 6, 1993

[54] ELECTRONIC THERMOSTAT HAVING CORRECTION FOR INTERNALLY GENERATED HEAT FROM LOAD SWITCHING

[75] Inventor: John T. Adams, Minneapolis, Minn.

[73] Assignee: Honeywell Inc., Minneapolis, Minn.

[21] Appl. No.: 878,589

[22] Filed: May 5, 1992

[51] Int. Cl.$^5$ .............................................. G05D 15/00
[52] U.S. Cl. .................................... 236/78 R; 361/140
[58] Field of Search ................ 236/46 R, 78 D, 78 R; 165/26; 364/557; 361/140

[56] References Cited

U.S. PATENT DOCUMENTS

| | | | |
|---|---|---|---|
| 3,817,453 | 6/1974 | Pinckaers | 236/68 C |
| 4,741,476 | 5/1988 | Russo et al. | 236/46 R |
| 5,002,226 | 3/1991 | Nelson | 236/78 R |

Primary Examiner—William E. Wayner
Attorney, Agent, or Firm—Edward Schwarz

[57] ABSTRACT

The apparatus controlling operation of a digital thermostat mounted in an enclosure corrects the internally measured temperature for heat generated within the thermostat enclosure by the switching element controlling operation of the load, typically a HVAC unit. The actual ambient temperature is derived by subtracting from the internal temperature a correction value which follows the fraction of total time the switching element conducts power for the HVAC unit (duty cycle). The duty cycle is preferably multiplied by a scale factor and the difference between the ambient temperature as currently calculated and the internal temperature to form the correction value.

15 Claims, 1 Drawing Sheet

ELECTRONIC THERMOSTAT HAVING CORRECTION FOR INTERNALLY GENERATED HEAT FROM LOAD SWITCHING

BACKGROUND OF THE INVENTION

Electronic thermostats are now very common devices, and allow improved accuracy in controlling heating and air conditioning equipment. Such thermostats have integral microprocessors which can apply sophisticated control algorithms to control overshoot or undershoot, and include setback and recovery functions which improve efficiency in maintaining space temperature. The elements of such a thermostat are mounted within an enclosure to protect and conceal them. These thermostats also include an internal temperature sensor which provides an analog signal encoding the temperature internal to the enclosure which the microprocessor converts to a digital value for control of space temperature.

The load is switched either by some type of solid state element or alternatively by a relay. In either case, heat is generated by the switching element while conducting load power. This heat generated by the load power switching element can affect the internal temperature of the thermostat enclosure and cause the temperature sensor to provide a signal which indicates a temperature value higher than the actual temperature external to the thermostat enclosure. One can see that this error can cause space temperature to be maintained at less than the desired value. Even worse, if the user attempts to correct for this error by setting the thermostat to a higher temperature than desired, the change in duty cycle arising from changes in heating or cooling load can change the error.

This problem has been previously recognized. U.S. Pat. No. 4,741,476 measures the switch element heat with a pair of thermistors at different distances from the switching element. The difference in the temperature indicated by the two thermistors provides a measure of the heat generated by the switching element.

U.S. Pat. No. 3,817,453 solves this problem by placing a thermistor adjacent to the switching element. The thermistor is in the bridge which controls thermostat operation, and the change in the thermistor resistance affects operation of the bridge and thereby the thermostat to reduce the effect of switching element heat.

BRIEF DESCRIPTION OF THE INVENTION

With a microprocessor executing the various algorithm for operating the thermostat functions, it is possible to use the actual duty cycle of the thermostat's switching element as the independent variable in an equation which corrects the error arising from the switching element. There are two different ways in which the duty cycle can be calculated. In the first, the actual average duty cycle is calculated and multiplied by the previously measured temperature rise generated by a 100% duty cycle. In the second, the difference between the set point temperature and the actual room temperature is used to predict the duty cycle needed to hold the room temperature within the control range. Each embodiment comprises a thermostat for controlling flow of electrical power to a load and having an enclosure within which the various elements of the thermostat are mounted. Both embodiments of the invention further include a controller providing a switch control signal having first and second states and a switching element receiving the switch control signal for conducting power for the load responsive to the switch control signal's first state and generating heat within the enclosure when conducting load power.

The first embodiment is an improvement for providing a correction signal encoding a correction value substantially equal to the difference between the internal temperature within the enclosure and the ambient temperature external to the enclosure. This embodiment does not use either a set point temperature or an internal enclosure temperature to calculate the correction value. The first embodiment comprises a) duty cycle means receiving the switch control signal for providing a duty cycle function signal encoding a duty cycle function value following the average fraction of total time the switch control signal's first state exists; and b) correction signal means receiving the duty cycle function signal for providing the correction signal encoding a correction value equal to the product of the duty cycle function value and a predetermined constant value encoded in a constant value signal.

The controller in the second embodiment includes a set point signal encoding a set point temperature at which the ambient temperature is to be maintained. The switch control signal which the controller provides again has first and second states which are selected by the controller in a way tending to reduce the difference between the set point temperature and the temperature external to the enclosure. The second embodiment also includes a temperature sensor within the enclosure providing a sensor signal encoding the temperature internal to the enclosure.

The second embodiment also, is an improvement for providing a correction signal encoding a correction value substantially equal to the difference between the internal temperature within the enclosure and the ambient temperature external to the enclosure, with the correction value also encoded in the correction signal. This second embodiment comprises a) duty cycle means receiving the set point signal, the correction signal, and the sensor signal, for providing a duty cycle signal encoding a duty cycle value following a function of the difference between the set point temperature and the internal temperature in the enclosure, plus the value currently encoded in the correction signal; and b) correction signal means receiving the duty cycle signal from the duty cycle means for providing the correction signal encoding a correction value equal to the product of the duty cycle value and a predetermined constant value encoded in a constant value signal.

In this second preferred embodiment, the duty cycle means further includes means for providing a duty cycle signal following a time integral value of the difference between the set point temperature and the internal temperature in the enclosure, plus the value currently encoded in the correction signal, all multiplied by an integral gain constant. The correction value which this algorithm provides to the measured enclosure temperature allows the temperature control algorithm to hold the room temperature surrounding the thermostat very close to the set point temperature. Thus, if the room temperature falls below the set point value, the integral value increases slowly, driving the room temperature closer to the set point temperature.

DESCRIPTION OF THE PREFERRED EMBODIMENTS

Figure 1:
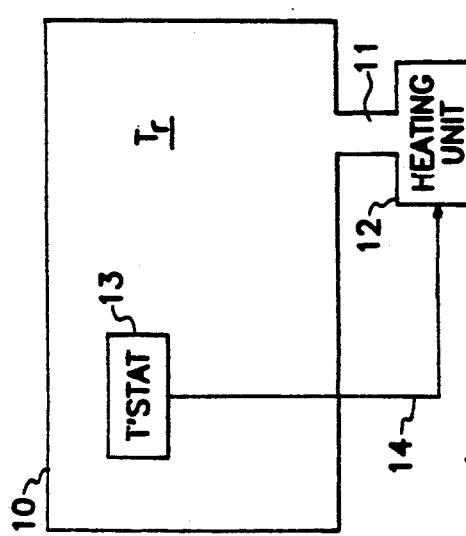
FIG. 1 is a block diagram of a thermostat built according to the invention and installed in a room.

FIG. 1 shows a conventional installation of a heating system for a room 10. A heating unit 12 supplies heated air through a duct 11 to the room 10 for so long as a heating signal is present on path 14. The interior or room temperature of room 10 is shown as $T_r$. The invention will be presented in a heating context, where heat is constantly escaping from room 10 to cooler surroundings. The invention is also applicable to the air conditioning situation. Thermostat 13 constantly monitors $T_r$ and provides the heating signal on path 14 as needed to hold $T_r$ as close to the thermostat 13 setting as possible.

Figure 2:
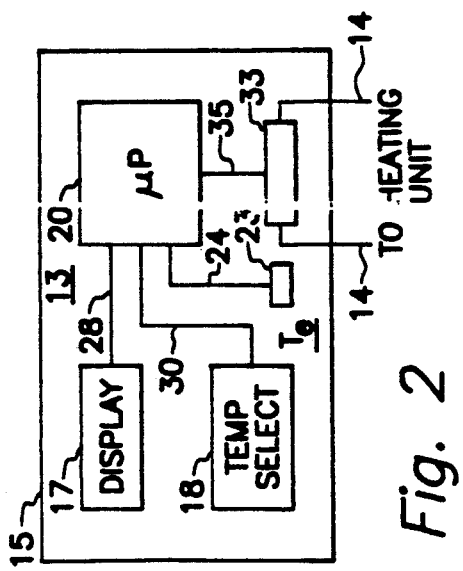
FIG. 2 is a block diagram of the elements of a thermostat in which the invention may be used.

In FIG. 2, the internal elements of a conventional electronic thermostat 13 are all shown as housed within an enclosure 15. Among these elements is a microprocessor 20 which performs all of the control operations of the thermostat. A display 17 provides the occupant of the room with information needed for operating the thermostat. A keyboard 18 allows the occupant to select the set point temperature, i.e. the temperature at which $T_r$ is to be held. The heating unit 12 is controlled by a switching element 33, which closes when heat is required to thereby pass operating current, typically 24 VAC to heating unit 12 for operating its various components. Switching element 33 operates under the control of microprocessor 20, receiving a control signal on path 35, and may be an electromechanical relay, a triac, or a transistor, depending on design preference. The control signal on path 35 has a first state which puts switching element 33 in conduction so that current can flow on lines 14. In response to the second state of the control signal on path 35, switching element 33 does not conduct. In any case, all available devices usable as a switching element 33 is of the type which has non-zero impedance. The ratio of time the switching element 33 is closed to total time is referred to as duty cycle, and a duty cycle of 100% means that the switching element 33 is always conducting. The ambient temperature is sensed by a temperature sensor 23 which provides an analog signal on path 24 to microprocessor 20. Microprocessor 20 converts this analog temperature signal into a digital value which can be manipulated as any other data.

The problem which this invention addresses arises when switching element 33 is conducting. Because element 33 has a non-zero impedance, heat is generated within it by the current for heating unit 12 which passes through it. The amount of this heat is not great, but is sufficient to alter the enclosure 14 temperature $T_e$ in the vicinity of sensor 23. This in turn causes an incorrect indication of temperature by sensor 23 to microprocessor 20, resulting in the heating case, of $T_r$ being held too low.

Figure 3:
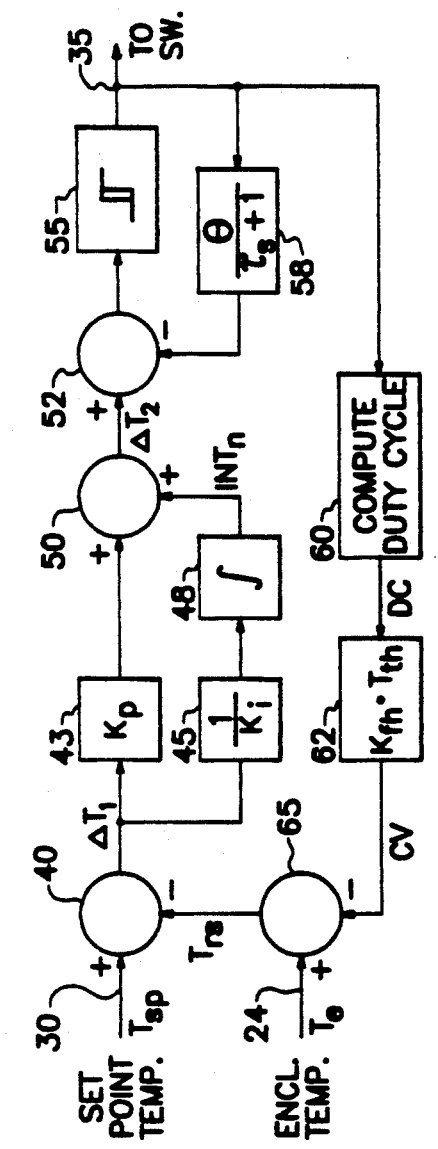
FIG. 3 is a diagram of the algorithm which the thermostat hardware executes in a first embodiment of the invention.
Figure 4:
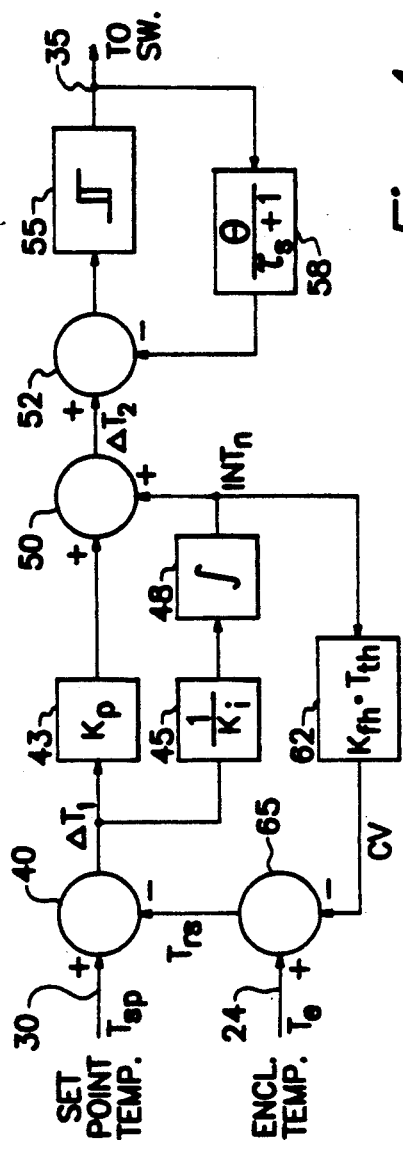
FIG. 4 is a diagram of the algorithm which the thermostat hardware executes in a second embodiment of the invention.

As mentioned previously, the solution which this invention provides to this problem is to use the actual present duty cycle to develop a correction value which is an estimate of the error introduced into the temperature sensor 23 signal by the conduction of current by switching element 33. In the embodiments of FIGS. 3 and 4, the actual correction value CV is subtracted from the enclosure temperature $T_e$ to yield a synthesized room temperature $T_{rs}$. FIGS. 3 and 4 may be considered to be either a block diagram of individual hardware arithmetic elements or a software computation diagram from which the individual instructions for implementing within microprocessor may be derived. It should be realized that while the invention on one level is an algorithm, it is ultimately implemented as tangible, physical hardware within the thermostat 13 on another. As such, the algorithm is no different from any other blueprint or design specification defining the structure of some type of apparatus.

In the computation diagrams of FIGS. 3 and 4, the individual circles with entering arrowheads indicate summation of the values carried on the paths according to the adjacent + and − signs. Individual rectangular blocks indicate some non-additive operation such as multiplication, integration, or component control with the value carried by the entering path being the operand. Thus, in FIG. 3, summing block 40 indicates that the synthesized room temperature $T_{rs}$ is subtracted from the set point temperature $T_{sp}$ to calculate the value provided to block 43. Block 43 indicates that the value provided to it by block 40 is multiplied by $K_p$ and this product is provided as the input indicated to block 50.

Turning next to FIG. 3, the embodiment here uses duty cycle directly to develop the correction value CV. In this embodiment the calculation for duty cycle is shown very generally as simply generating a duty cycle function signal following the average fraction of total time the control signal on path 35 (FIG. 2) has its first state. The duty cycle function signal provided on path 35 to switching element 33 may be simply a moving, weighted, average of recent duty cycles. The block diagram of FIG. 3 may be represented by the recursive equations:

$$\Delta T_2 = [T_{sp} - (T_e - DC \cdot K_{fh} \cdot T_{th})]K_p + INT_n \quad (1)$$

where $\Delta T_2$ is the composite error on which the duty cycle is based $T_{sp}$ is the set point temperature $T_e$ is the interior temperature of the enclosure DC is the duty cycle $K_{fh}$ is a false heat coefficient $T_{th}$ is the total rise of the enclosure temperature at 100% duty cycle as sensed by the temperature sensor $K_p$ is a proportional gain constant (1 for certain types of thermostats)

$INT_n$ is the integral of $T_{sp} - T_{rs} (= \Delta T_1)$ over time and $T_{rs}$ is the synthesized room temperature $INT_n$ may be approximated by $$INT_n = INT_{n-1} + (T_{sp} - T_{rs})/K_i \quad (2)$$

where $K_i$ is an integration constant, and is taken as 64 in one implementation of this invention These two equations are recursively computed at regular intervals, one minute for convenience. $T_{th}$ is determined empirically by holding the first state of the switch control signal for a relatively long period of time and sensing the difference between $T_e$ (enclosure temperature) and the actual room temperature external to enclosure 14. The remaining constants are well known as forming part of temperature control algorithms now in use.

The computational elements shown in FIG. 3 implement equations 1 and 2. The output on path 35 is used to control the conduction of switching element 33. Elements 52, 55, and 58 form the standard electronic thermostat control loop. This loop is based on the composite error $\Delta T_2$. Element 60 computes the duty cycle as a moving, weighted, average of the recent duty cycle history.

Multiplier element 62 forms the product $DC \cdot K_{fh} \cdot T_{th}$ as the correction value CV. CV is subtracted from the enclosure temperature $T_e$ by summing element 65 to yield a synthesized room temperature $T_{rs}$. Element 40 forms a value $\Delta T_1 = T_{sp} - T_{rs}$ which is the actual difference between the set point temperature and the synthesized (calculated) room temperature. This calculation of $\Delta T_1$ is conventional. $\Delta T_1$ is multiplied by $K_p$, shown by computational element 43 to form one input for summing element 50. The integration value $INT_n$ is calculated by elements 45 and 48 to form the second input for summing element 50. The output of summing element 50 is $\Delta T_2$, the composite error of equation 1. The computations of FIG. 3 may be recalculated every minute to provide a new $\Delta T_2$ for a new switch control signal on path 35.

FIG. 4 is quite similar to FIG. 3, and the similar calculating elements have the same reference numbers. The $INT_n$ value calculated by elements 45 and 48 is an accurate approximation of duty cycle, and is a preferred duty cycle function value. $INT_n$ is preferred as the duty cycle function value because it is a more stable value than DC, and because it is already available as part of the temperature control algorithm, whose computation eventually results in the switch control signal on path 35 of FIG. 2. Accordingly, the value $INT_{n-1}$ is provided to element 62 as the preferred value for DC and equation 1 becomes $$\Delta T_2 = [T_{sp} - (T_e - INT_{n-1} \cdot K_{fh} \cdot T_{th})] K_p + INT_n \qquad (3)$$

Accordingly, FIG. 4 and equation 3 are the preferred embodiment for this invention at the present time.

I claim:

1. In a thermostat for controlling flow of electrical power to a load and having an enclosure, a controller providing a switch control signal having first and second states, a switching element receiving the switch control signal for conducting power for the load responsive only to the switch control signal's first state and generating heat within the enclosure when conducting load power, an improvement for providing a correction signal encoding a correction value substantially equal to the difference between the internal temperature within the enclosure and the ambient temperature external to the enclosure, comprising
   a) duty cycle means receiving the switch control signal for providing a duty cycle function signal encoding a duty cycle function value following the average fraction of total time the switch control signal's first state exists; and
   b) correction signal means receiving the duty cycle function signal for providing the correction signal encoding a correction value equal to the product of the duty cycle function value and a predetermined constant value encoded in a constant value signal.

2. The improved thermostat apparatus of claim 1, including constant value setting means for providing the constant value signal with a constant value substantially equal to the product of a scale factor and the steady state difference between the internal temperature and the ambient temperature when the switching element continuously conducts power to the load.

3. The improved thermostat apparatus of claim 2 for use in a system wherein the load when receiving power changes the ambient temperature, wherein the controller further provides a set point signal encoding a set point temperature at which the ambient temperature is to be maintained and provides a switch control signal controlling power to the load so as to drive the ambient temperature toward the set point temperature, and wherein the thermostat includes a temperature sensor providing a sensor signal encoding the temperature internal to the enclosure, the improvement further comprising ambient temperature means receiving the temperature sensor signal and the correction signal for providing an ambient temperature signal encoding a synthesized ambient temperature equal to the internal temperature less the correction value; and wherein the duty cycle means further comprises integration means receiving the ambient temperature signal and the set point temperature signal for encoding in the duty cycle signal a value which is a function of the difference between the set point temperature and the synthesized ambient temperature.

4. The thermostat apparatus of claim 3, wherein the duty cycle means further includes means encoding in the duty cycle signal a value which is a function of a current integration value equal to the sum of the previous integration value and the difference between the set point temperature and the synthesized ambient temperature.

5. The thermostat apparatus of claim 3, wherein the integration means includes means for calculating the current integration value equal to the sum of the previous integration value and the product of a fractional constant and the difference between the set point temperature and the synthesized ambient temperature.

6. The thermostat apparatus of claim 3, wherein the integration means includes limit means for holding the integration value between maximum and minimum values, and the constant value setting means includes means for setting the scale factor to the inverse of the difference between the maximum and the minimum values of the integration value.

7. The thermostat apparatus of claim 6, wherein the constant value setting means includes means for setting the scale factor minimum and maximum values equal to zero and three respectively.

8. A method for operating the thermostat apparatus of claim 2, comprising the steps of
   a) placing the thermostat apparatus in a constant temperature environment;
   b) applying a switch control signal having a constant first state to the switching element;
   c) sensing the internal temperature;

d) measuring as the total heat temperature, the difference between the internal and ambient temperatures after no substantial change in the internal temperature over time is perceived; and e) providing the constant value signal encoding a constant value substantially equal to the product of the scale factor and the total heat temperature.

9. The improved thermostat apparatus of claim 1 for use in a system wherein the load when receiving power changes the ambient temperature, wherein the controller further provides a set point signal encoding a set point temperature at which the ambient temperature is to be maintained and provides a switch control signal controlling power to the load so as to drive the ambient temperature toward the set point temperature, and wherein the thermostat includes a temperature sensor providing a sensor signal encoding the temperature internal to the enclosure, the improvement further comprising ambient temperature means receiving the temperature sensor signal and the correction signal for providing an ambient temperature signal encoding a synthesized ambient temperature equal to the internal temperature less the correction value; and wherein the duty cycle means further comprises integration means receiving the ambient temperature signal and the set point temperature signal for encoding in the duty cycle signal a value which is a function of the difference between the set point temperature and the synthesized ambient temperature.

10. The thermostat apparatus of claim 9, wherein the duty cycle means further includes means encoding in the duty cycle signal a value which is a function of a current integration value equal to the sum of the previous integration value and the difference between the set point temperature and the synthesized ambient temperature.

11. The thermostat apparatus of claim 10, wherein the integration means includes means for calculating the current integration value equal to the sum of the previous integration value and the product of a fractional constant and the difference between the set point temperature and the synthesized ambient temperature.

12. In a thermostat for controlling flow of electrical power to a load and having an enclosure, a switching element receiving a switch control signal having first and second states for conducting power for the load responsive to the switch control signal's first state and generating heat within the enclosure when conducting load power, a controller providing a set point signal encoding a set point temperature at which the ambient temperature is to be maintained and providing the switch control signal with first and second states tending to reduce the difference between the set point temperature and the temperature external to the enclosure, and a temperature sensor within the enclosure providing a sensor signal encoding the temperature internal to the enclosure, an improvement for providing a correction signal encoding a correction value substantially equal to the difference between the internal temperature within the enclosure and the ambient temperature external to the enclosure, and comprising a) duty cycle means receiving the set point signal, the correction signal, and the sensor signal, for providing a duty cycle signal encoding a duty cycle value following a function of the difference between the set point temperature and the internal temperature in the enclosure, plus the value currently encoded in the correction signal; and b) correction signal means receiving the duty cycle signal from the duty cycle means for providing the correction signal encoding a correction value equal to the product of the duty cycle value and a predetermined constant value encoded in a constant value signal.

13. The improvement of claim 12, wherein the correction signal means further includes constant value means for providing the constant value signal as a function of the temperature rise $T_{th}$ within the enclosure arising from continuous conduction of load power by the switching element.

14. The improvement of claim 13, wherein the constant value means includes means for providing the constant value signal encoding a constant value equal to the product of $T_{th}$ and a false heat gain constant.

15. The improvement of claim 12, wherein the duty cycle means further includes means for providing a duty cycle signal following a time integral value of the difference between the set point temperature and the internal temperature in the enclosure, plus the value currently encoded in the correction signal, all multiplied by an integral gain constant.

* * * * *